United States Patent
Reid

(10) Patent No.: US 8,285,940 B2
(45) Date of Patent: Oct. 9, 2012

(54) METHOD AND APPARATUS FOR HIGH SPEED CACHE FLUSHING IN A NON-VOLATILE MEMORY

(75) Inventor: Robert Alan Reid, Superior, CO (US)

(73) Assignee: Cadence Design Systems, Inc., San Jose, CA (US)

( * ) Notice: Subject to any disclaimer, the term of this patent is extended or adjusted under 35 U.S.C. 154(b) by 555 days.

(21) Appl. No.: 12/040,782

(22) Filed: Feb. 29, 2008

(65) Prior Publication Data

US 2009/0222627 A1 Sep. 3, 2009

(51) Int. Cl.
*G06F 12/00* (2006.01)
(52) U.S. Cl. .......................... 711/135; 711/144
(58) Field of Classification Search ............ 711/135
See application file for complete search history.

(56) References Cited

U.S. PATENT DOCUMENTS

| | | | | |
|---|---|---|---|---|
| 2004/0085849 A1* | 5/2004 | Myoung et al. | .............. | 365/232 |
| 2006/0064556 A1* | 3/2006 | Aasheim et al. | .............. | 711/156 |
| 2006/0072369 A1* | 4/2006 | Madter et al. | .............. | 365/232 |
| 2007/0016719 A1* | 1/2007 | Ono et al. | .............. | 711/103 |
| 2007/0168698 A1* | 7/2007 | Coulson et al. | .............. | 714/5 |
| 2009/0193193 A1* | 7/2009 | Kern | .............. | 711/128 |

* cited by examiner

*Primary Examiner* — Tuan Thai
*Assistant Examiner* — Ngoc Dinh
(74) *Attorney, Agent, or Firm* — Sawyer Law Group, P.C.

(57) ABSTRACT

An invention is provided for performing flush cache in a non-volatile memory. The invention includes maintaining a plurality of free memory blocks within a non-volatile memory. When a flush cache command is issued, a flush cache map is examined to obtain a memory address of a memory block in the plurality of free memory blocks within the non-volatile memory. The flush cache map includes a plurality of entries, each entry indicating a memory block of the plurality of free memory blocks. Then, a cache block is written to a memory block at the obtained memory address within the non-volatile memory. In this manner, when a flush cache command is received, the flush cache map allows cache blocks to be written to free memory blocks in the non-volatile memory without requiring a non-volatile memory search for free blocks or requiring erasing of memory blocks storing old data.

14 Claims, 7 Drawing Sheets

METHOD AND APPARATUS FOR HIGH SPEED CACHE FLUSHING IN A NON-VOLATILE MEMORY

BACKGROUND OF THE INVENTION

1. Field of the Invention

This invention relates generally to non-volatile memory, and more particularly to providing high speed cache flushing in a non-volatile memory.

2. Description of the Related Art

Today, data processing systems often reduce memory access time through the use of cache memory. Cache memory generally is a small high speed memory utilized to temporarily replicate portions of main memory that are frequently accessed. As a result, the average memory access time is reduced because most memory access is to the cache memory, which generally is faster than main memory. Thus, software executing on the system generally executes faster because most software tends to access the same portions of memory many times. Hence, the system is able to perform fewer memory accesses to slower main memory when the frequently accessed data is stored in cache.

In general, each memory access request is passed to a cache controller, which tracks which portions of main memory are currently stored in cache memory. If a memory access request (i.e., read request or write request) is made to data currently stored in cache memory, a "cache hit" occurs and the cache memory is utilized to complete the memory access request. However, if the memory access request is made to data not currently stored in cache memory, a "cache miss" occurs, and the data is accessed from main memory. In some systems, when a miss occurs, the cache controller can assign the requested miss address to the cache memory and fetch the data from main memory to store in the cache memory.

While cache memory is useful during memory access, problems can occur during sudden losses in power. When the system detects a pending power problem, the system generally needs to prepare itself for the power loss by flushing the cache memory. This can also occur at other times, such as when the system prepares to power down. Cache flushing refers to the method by which a system writes the data currently stored in cache memory back to main memory. That is, when the system prepares to shut down or detects a pending power problem, the system generates a flush cache command. In response, the data stored in the cache memory is written to the corresponding addresses in main memory. The flush cache process is generally straight forward in terms of volatile memory; however, the process is more complex when using non-volatile memory.

Non-volatile memory is memory that stores data when power is disconnected from the system. Phase-change memory (PCM) and flash memory are examples of non-volatile computer memory. Flash memory is a non-volatile computer memory that can be electrically erased and reprogrammed. Because flash memory retains stored data even when power to the memory is turned off, flash memory is widely used in battery-portable devices. For example, flash memory often is utilized in digital audio players, digital cameras, mobile phones, and USB flash drives, which are used for general storage and transfer of data between computers.

FIG. 1 is an illustration showing a typical prior art non-volatile memory arrangement. As illustrated in FIG. 1, a non-volatile memory 100 generally comprises a plurality of memory blocks 102, which generally is the smallest portion of memory that can be erased. Each memory block 102 generally comprises a fixed plurality of pages 104, which is the smallest size element that can be written or read from the non-volatile memory 100.

Unlike many other storage devices, non-volatile memory devices generally cannot be overwritten. Instead, to update data in a particular storage location within non-volatile memory, the location must first be erased, then the new data written in its place. Moreover, when erasing data in a flash device, an entire block must be erased instead of just the particular page or pages of the block that were updated. To facilitate this process, a typical flash controller will find a block of memory that has been previously erased and write the updated page to this new block at the same page offset. Then, the remaining pages of the old block are copied to the new block. Later, the old block is erased and made available for use by some other operation. Thus, when performing a flush cache command, the system generally is required to find free memory for the data stored in cache memory prior to flushing the cache memory.

FIG. 2 is a flowchart showing a prior art method 200 for flushing cache when utilizing a non-volatile memory for data storage. In an initial operation 202, preprocess operations are performed. Preprocess operations can include, for example, detecting a pending power loss, receiving a low power mode request, and other preprocess operations that will be apparent to those skilled in the art.

In a search operation 204, the non-volatile memory is searched for a free memory block. After receiving a flush cache command, the non-volatile memory is searched to find a free memory block for each cache block in cache memory. A free memory block is a memory block that is a good memory block (i.e., not damaged or worn out), not currently storing data, and has been erased. This search can be performed by searching the actual memory array, or by searching, for example, a table storing data regarding the current contents of the non-volatile memory array.

A decision is then made as to whether a free memory block currently exists in the non-volatile memory, in operation 206. If a free memory block currently exists in the non-volatile memory, the method 200 continues to operation 210. Otherwise, the method 200 branches to operation 208.

When the non-volatile memory does not currently include a free memory block, an old memory is erased to enable the cache data to be written in its place, in operation 208. As mentioned above, non-volatile memory generally cannot be overwritten. Thus, if a free memory block does not currently exist in the non-volatile memory, memory needs to be freed up to make room for the cache data. When data is no longer being used in non-volatile memory, the memory block storing the data is marked as storing old data. Generally, the memory block is erased during idle periods. However, it is possible that old data will be present in the non-volatile memory at the time a flush cache command is issued. When this occurs, the memory block storing the old data is erased to enable the memory block to be used to store cache data.

If a free memory block currently exists in the non-volatile memory, or after a memory block storing old data has been erased in operation 208, the cache block is written to the free block in non-volatile memory, in operation 210. Cached data for non-volatile memory often is stored as a cache block in cache memory. Each cache block corresponds to a memory block in non-volatile memory. Thus, during operation 210, the current cache block is written to non-volatile memory.

Another decision is then made as to whether more cache blocks need to be written to non-volatile memory, in operation 212. If more cache blocks need to be written to non-volatile memory, the method 200 continues with another search operation 204. Otherwise, the method 200 completes in operation 214. Then, in operation 214, post process operations are performed. Post process operations can include system shutdown, and other post process operations that will be apparent to those skilled in the art.

Unfortunately, searching for free memory blocks and erasing old memory blocks can take considerable time, depending on the size of the cache memory and the amount of non-volatile memory data cached. For example, the worst case scenario is represented by equation 1 below:

$$N*(T1+T2) \quad (1)$$

where N is the number of cache blocks, T1 is the erase time for a memory block, and T2 is the program/write time for a memory block. In typical prior art systems, this can take in the range of about N*20 Msecs, which is a relatively long time particularly when a power loss is pending.

In view of the foregoing, there is a need for systems and methods for providing high speed cache flushing in a non-volatile memory. The systems and methods should decrease the amount of time required to complete a flush cache command. In addition, the systems and methods should not unduly burden the system or have prohibitive costs associated with them.

SUMMARY OF THE INVENTION

Broadly speaking, the present invention addresses these needs by providing high speed cache flushing in a non-volatile memory utilizing a flush cache map. For example, in one embodiment, a method for performing a cache flush in a non-volatile memory is disclosed. The method includes maintaining a plurality of free memory blocks within a non-volatile memory. When a flush cache command is issued, a flush cache map is examined to obtain a memory address of a memory block in the plurality of free memory blocks within the non-volatile memory. The flush cache map includes a plurality of entries, such as pointers, each entry indicating a memory block of the plurality of free memory blocks. Then, a cache block is written to a memory block at the obtained memory address within the non-volatile memory. In this manner, when a flush cache command is received, the flush cache map allows cache blocks to be written to free memory blocks in the non-volatile memory without requiring a non-volatile memory search for free blocks or requiring erasing of memory blocks storing old data. In general, each entry of the plurality of entries indicates a different free memory block of the plurality of free memory blocks in the non-volatile memory. In this case, the plurality of free memory blocks comprises a predetermined number of free memory blocks based on a predetermined number of cache blocks being utilized with the system. In this manner, the plurality of entries in the flush cache map can be examined sequentially to obtain addresses of free memory blocks in which to store cache blocks.

A further method for performing a cache flush in a non-volatile memory is disclosed in an additional embodiment of the present invention. Similar to above, the method includes maintaining a plurality of free memory blocks within a non-volatile memory. The method also includes examining a flush cache map to obtain a memory address of a memory block of the plurality of free memory blocks within the non-volatile memory and writing a cache block to a free memory block at the obtained memory address within the non-volatile memory. However, in this embodiment, the flush cache map also is examined to obtain an additional memory address of a memory block of the plurality of free memory blocks within the non-volatile memory. In this manner, a block table can be written to a free memory block at the obtained additional memory address within the non-volatile memory. The block table generally includes data utilized by the non-volatile memory file system, such as a plurality of entries mapping a physical block address of the non-volatile memory to a logical block address. In one aspect, the plurality of entries in the flush cache map can be examined sequentially to obtain addresses of free memory blocks in which to store cache blocks and the block table.

A flush cache map for high speed cache flush in a non-volatile memory is disclosed in a further embodiment of the present invention. The flush cache map includes a predetermined number of entries, where each entry indicates a free memory block within a non-volatile memory. As above, each of these free memory blocks is maintained free of data during operation of the non-volatile memory. An additional entry also is included, where a block table is written to the additional free memory block at the within the non-volatile memory. Generally, the predetermined number is based on a predetermined number of cache blocks. Hence, to ensure a free memory block is available to store the block table during a flush cache command, the predetermined number can be based on a predetermined number of cache blocks plus one. In one aspect, each entry is generated during system power-up. In this manner, embodiments of the present invention advantageously allow each cache block and the block table to be quickly saved in the non-volatile memory without requiring searches for free memory blocks. Moreover, because free memory blocks are reserved for cache flushing, embodiments of the present invention also do not require erasing of old memory blocks, thus saving additional time during a flush cache command. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for providing high speed cache flushing in a non-volatile memory utilizing a flush cache map. Broadly speaking, embodiments of the present invention utilize a map that comprises a plurality of entries, such as pointers, indicating free memory blocks in non-volatile memory. The entries can be updated as the non-volatile memory is utilized during normal operation. When a flush cache command is received, the flush cache map is utilized to write cache blocks to free memory blocks in non-volatile memory without requiring a non-volatile memory search for free blocks or requiring erasing of memory blocks storing old data.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
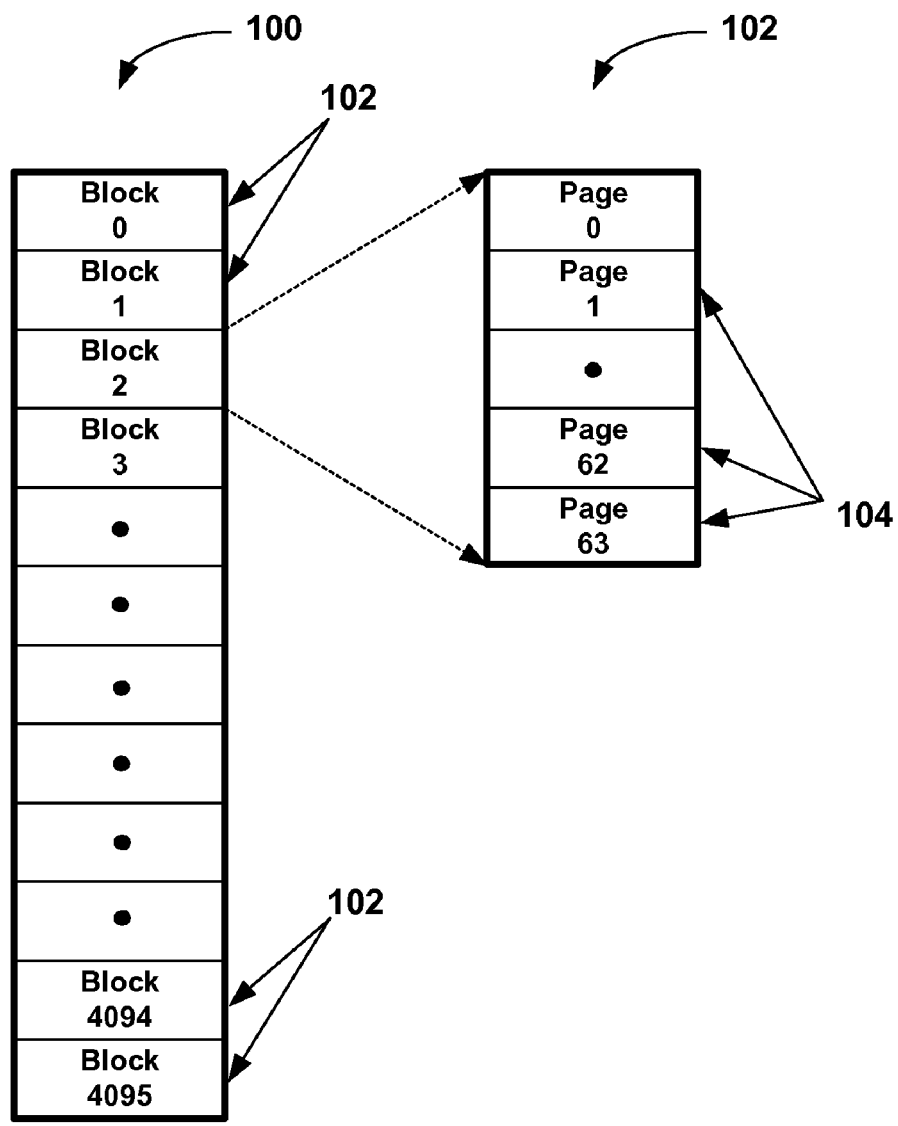
FIG. 1 is an illustration showing a typical prior art non-volatile memory arrangement.
Figure 2:
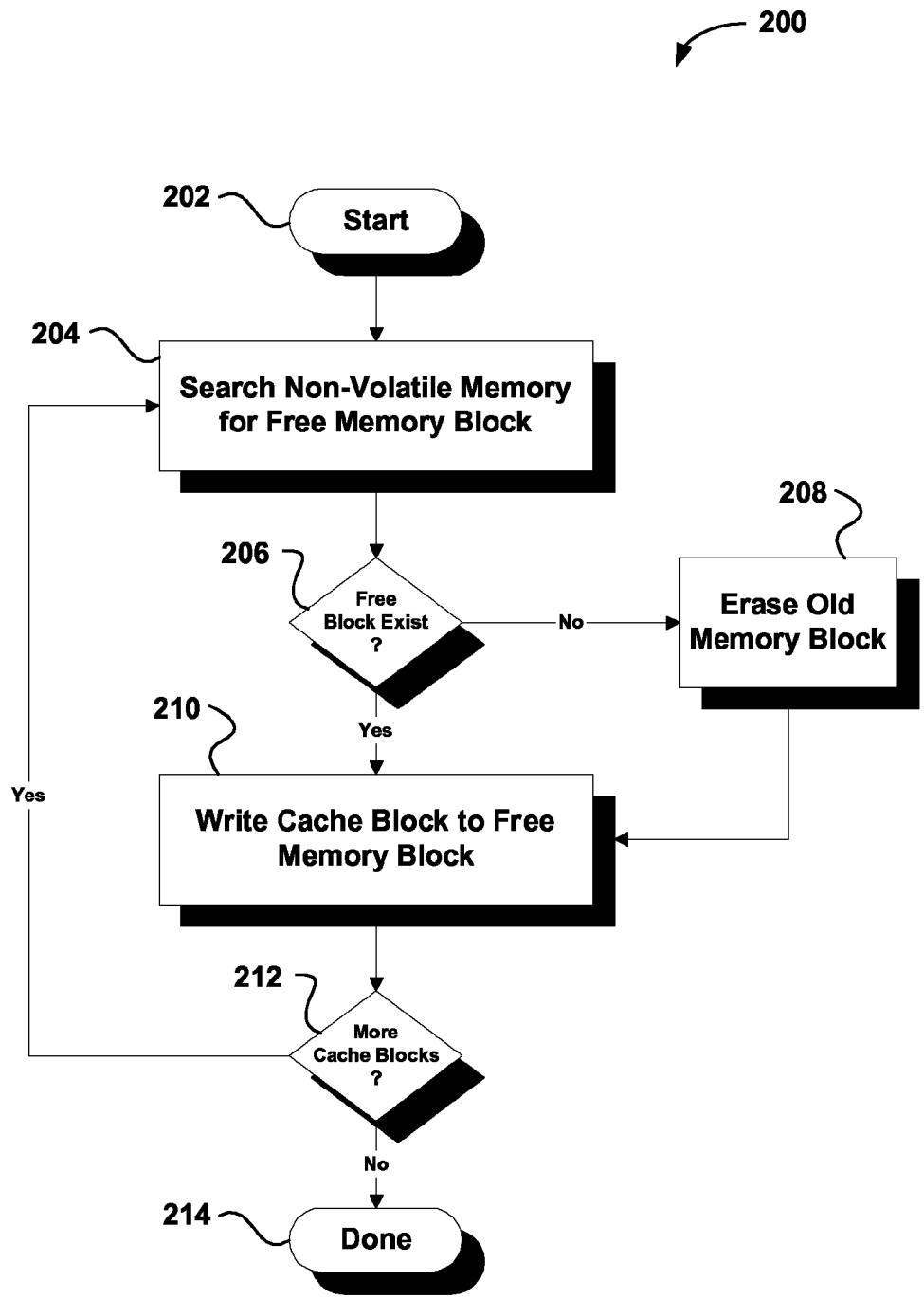
FIG. 2 is a flowchart showing a prior art method for flushing cache when utilizing a non-volatile memory for data storage.
Figure 3:
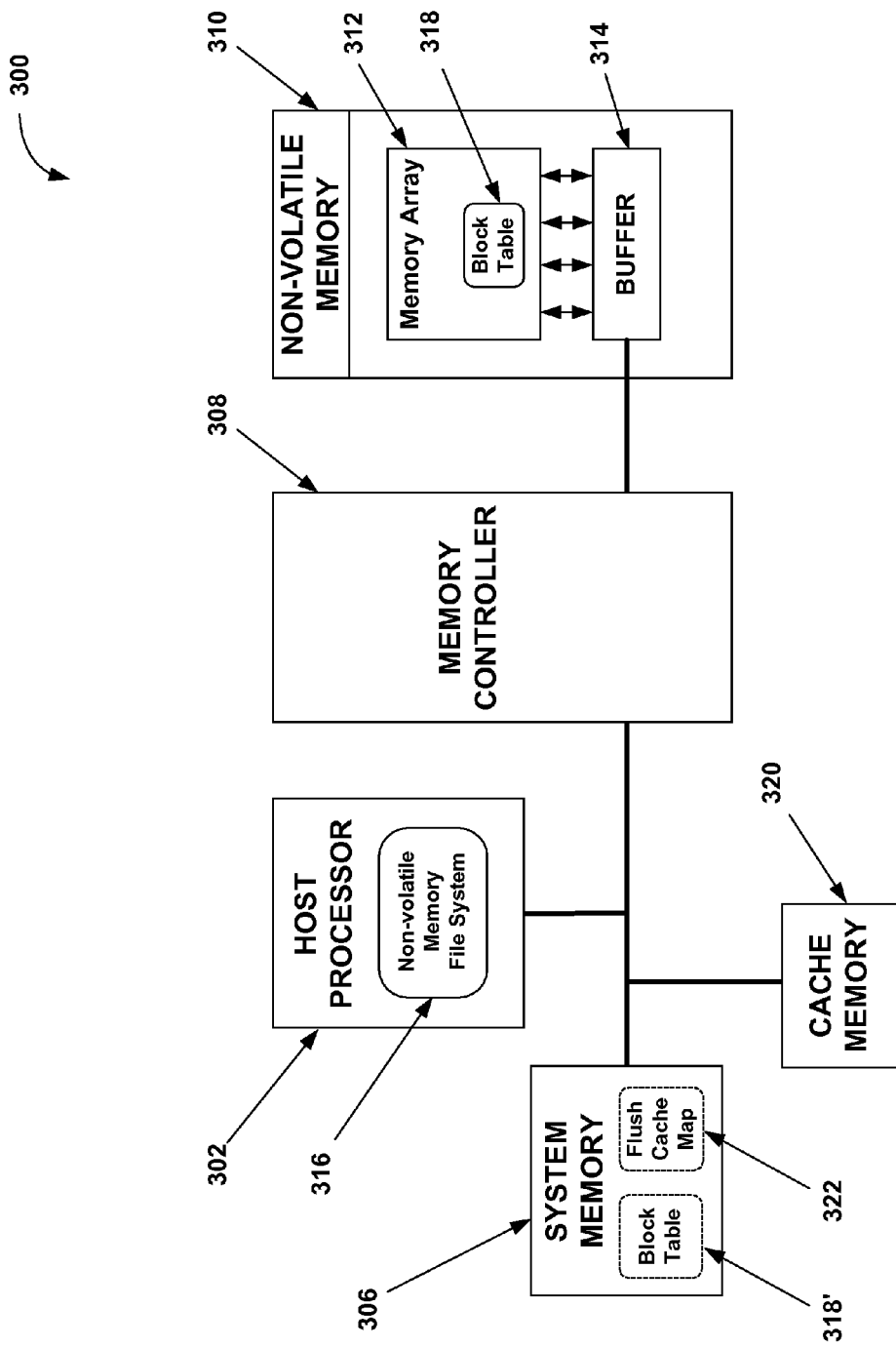
FIG. 3 is a diagram showing a system, which includes a flush cache map stored in memory, in accordance with an embodiment of the present invention.

FIGS. 1 and 2 were described in terms of the prior art. FIG. 3 is a diagram showing a system 300, which includes a flush cache map 322 stored in memory, in accordance with an embodiment of the present invention. The system 300 includes a host processor 302 coupled to system memory 306, cache memory 320, and a memory controller 308. The memory controller 308 is in communication with a non-volatile memory 310, which includes a memory array 312 coupled to a buffer 314. It should be noted that the non-volatile memory 310 can be any type of non-volatile memory, such as PCM, flash memory, or any other type of non-volatile memory as will be apparent to those skilled in the art after a careful reading of the present disclosure.

Executing on the host processor 302 is a non-volatile memory file system 316, which is utilized by the system 300 to access data stored in the non-volatile memory 310. Although the non-volatile memory file system 316 is shown executing on the host processor 302 in the example of FIG. 3, it should be noted that the non-volatile memory file system 316 can run on other processors as needed by the system 300. A flush cache map 322 is stored in system memory 306. As will be described in greater detail subsequently, the flush cache map 322 includes a plurality of entries, such as pointers, indicating free memory blocks in the non-volatile memory 310, which can be updated as the non-volatile memory 310 is utilized during normal operation. In addition, in one embodiment of the present invention a block table 318 is stored in a memory block of the memory array 312 of the non-volatile memory 310. As will be described in greater detail subsequently, the block table 318 stores much of the data needed by the non-volatile memory file system 316 for accessing data stored in the non-volatile memory 310. For example, the block table 318 includes address mapping, block status, and wear leveling data for the non-volatile memory 310.

Figure 4:
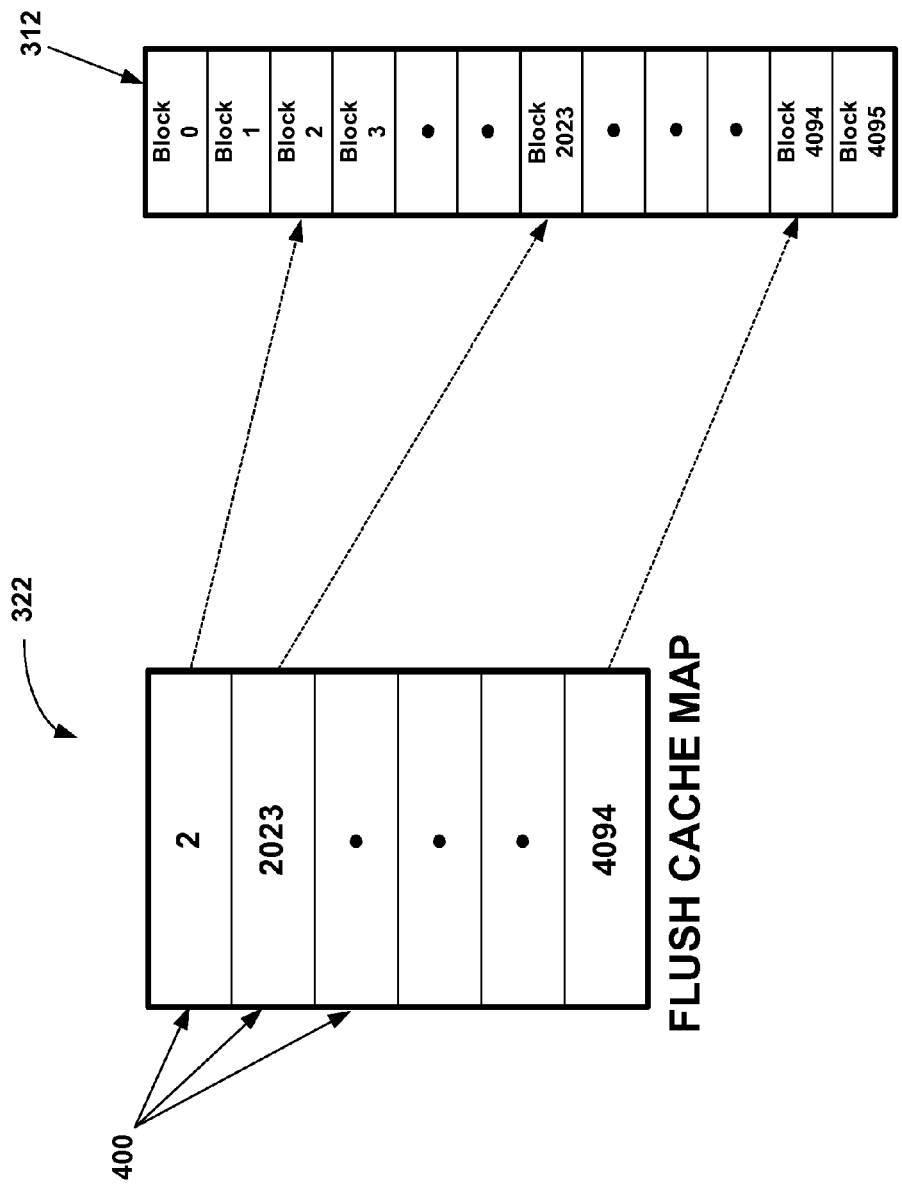
FIG. 4 is a block diagram showing an exemplary flush cache map, in accordance with an embodiment of the present invention.

During power up, and during idle times, the flush cache map 322 can be constructed. FIG. 4 is a block diagram showing an exemplary flush cache map 322, in accordance with an embodiment of the present invention. The flush cache map 322 includes a plurality of entries, such as pointers, indicating free memory blocks. For example, in FIG. 4, the flush cache map 322 includes a plurality of pointers 400, each pointing to a free memory block in the memory array 312. Each pointer 400 can be, for example, an address of a memory block within the non-volatile memory array 312. As mentioned previously, a free memory block is a memory block that is a good memory block (i.e., not damaged or worn out), not currently storing data, and that has been erased. In general, the number of pointers 400 included in the flush cache map 322 can be dependent on the amount of cache being utilized in the system 300.

In one embodiment, the flush cache map 322 is generated during power up and updated during system operation. More specifically, a predetermined number of free memory blocks within the non-volatile memory 310 are reserved for use with the flush cache map 322. That is, each of the reserved free memory blocks is maintained for use during a flush cache command. In one embodiment, the addresses of reserved memory locations can change during operation, as long as the number of reserved free memory blocks remains adequate to store all the cache blocks being utilized. Particular reserved memory blocks may change, for example, to maintain wear leveling. However, embodiments of the present invention reserved enough free memory blocks to store all the cache blocks being utilized by the system.

The flush cache map 322 is utilized to store the cache blocks during a flush cache command. That is, when a flush cache command is generated, each cache block is written to a memory block pointed to by a pointer 400 in the flush cache map 322. For example, when a flush cache command is generated, the flush cache map 322 in the example of FIG. 4 indicates that the first cache block will be written to the memory block at address 2 in the non-volatile memory array 312. The second cache block is written to the memory block at address 2023, and so on, until the last cache block is written to the memory block at address 4094. Although particular addresses are shown in FIG. 4 for illustration purposes, it should be noted that the pointers 400 of the flush cache map 322 can store any value as is appropriate for the particular non-volatile memory being utilized.

Figure 5:
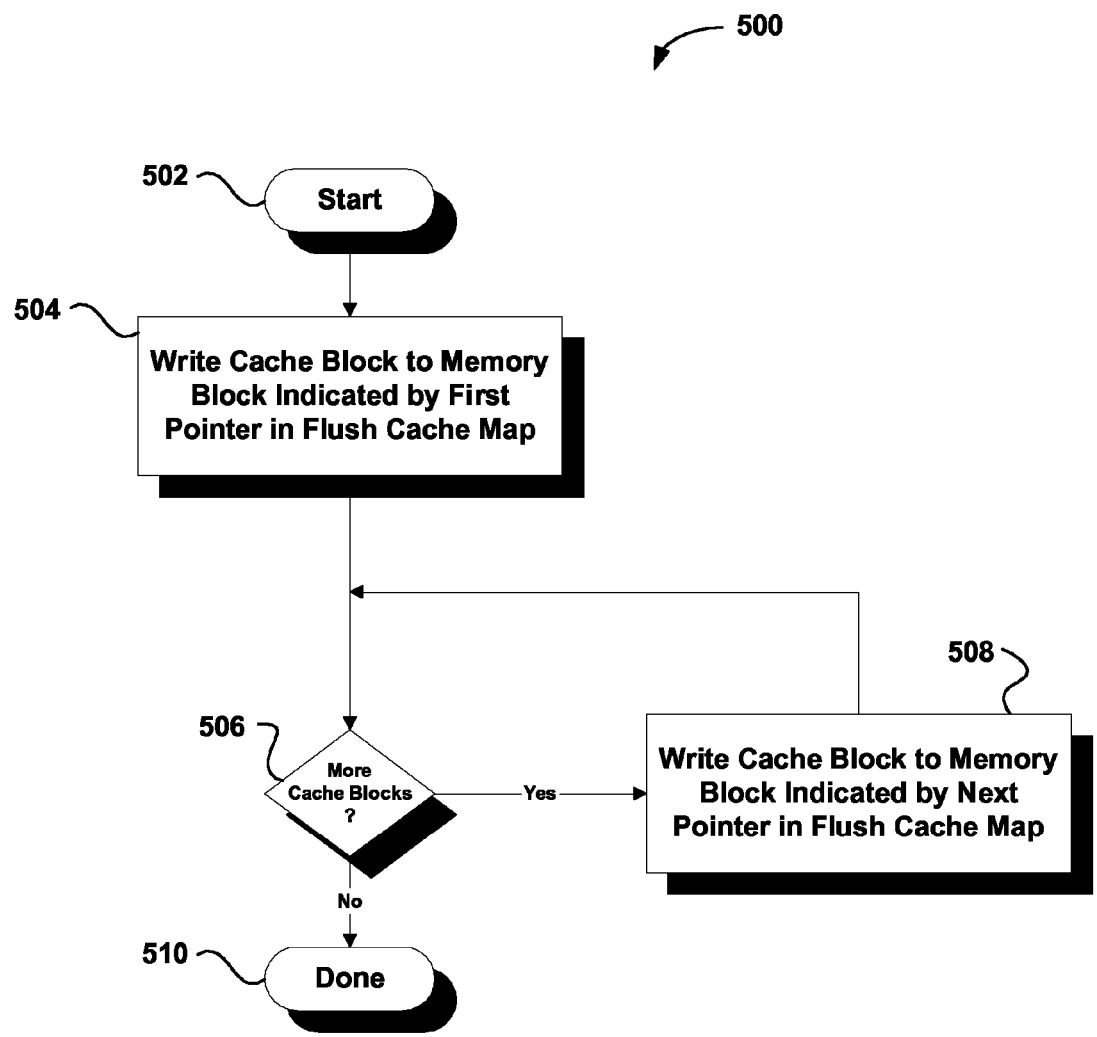
FIG. 5 is a flowchart showing a method for high speed cache flushing in a non-volatile memory, in accordance with an embodiment of the present invention.

FIG. 5 is a flowchart showing a method 500 for high speed cache flushing in a non-volatile memory, in accordance with an embodiment of the present invention. In an initial operation 502, preprocess operations are performed. Preprocess operations can include, for example, generating a flush cache map having pointers to reserved free memory blocks in non-volatile memory, detecting a pending power loss, receiving a low power mode request, and other preprocess operations that will be apparent to those skilled in the art after a careful reading of the present disclosure.

In operation 504, the first cache block in cache memory replicating a memory block in non-volatile memory is written to the memory block in non-volatile memory indicated by the first pointer in the flush cache map. As mentioned above, a particular number of free memory blocks within the non-volatile memory are reserved for use with the flush cache map. In one embodiment, the addresses of reserved memory locations can change during operation, as long as the number of reserved memory blocks remains adequate to store all the cache blocks being utilized. The flush cache map includes a plurality of pointers, each pointing to a reserved free memory block in the memory array of the non-volatile memory. In general, the number of pointers included in the flush cache map can be dependent on the amount of cache being utilized in the system.

A decision is then made as to whether more cache blocks need to be flushed from cache memory, in operation 506. The cache memory may include a plurality of cache blocks replicating memory blocks in the non-volatile memory. Each of these cache blocks are written to non-volatile memory when a flush cache command is generated. Hence, if more cache blocks need to be flushed from cache memory, the method 500 continues with operation 508. Otherwise, the method completes in operation 510.

In operation 508, the next cache block in cache memory replicating a memory block in non-volatile memory is written to the memory block in non-volatile memory indicated by the next pointer in the flush cache map. For example, during operation 504, using the flush cache map 322 in the example of FIG. 4, the first cache block is written to the memory block at address 2 in the non-volatile memory 310. Then, in operation 508, the next cache block in cache memory is written to the memory block indicated by the next pointer in the flush cache map 322, in this case address 2023, and so on, until the last cache block is written to the memory block at address 4094.

When no more cache blocks need to be flushed from cache memory, the method 500 completes in operation 510. Post process operations are performed in operation 510. Post process operations can include, for example, performing cache flush for other system memory, power down operations, and other post process operations that will be apparent to those skilled in the art after a careful reading of the present disclosure. In addition to pointers for cache blocks, in one embodiment an additional pointer is maintained in the flush cache map 322 to a memory block for storing the block table 318.

Figure 6:
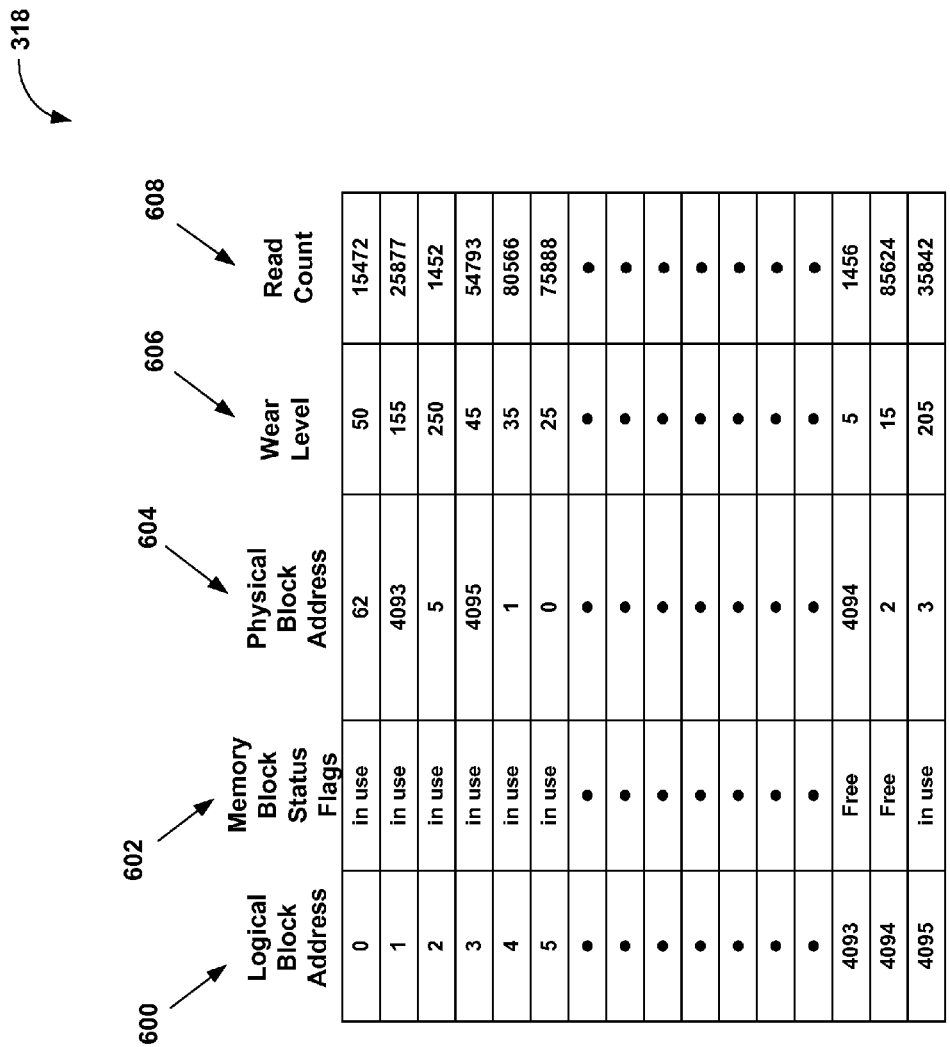
FIG. 6 is an illustration showing an exemplary block table, in accordance with an embodiment of the present invention.

FIG. 6 is an illustration showing an exemplary block table 318, in accordance with an embodiment of the present invention. The block table 318 includes logical block addresses 600, memory block status flags 602, physical block addresses 604, wear level indicators 606, and read count data 608. It should be noted, however, that a block table 318 of the embodiments of the present invention can include any data useful to the non-volatile file system in the operation of the non-volatile memory, as will be apparent to those skilled in the art after a careful reading of the present disclosure.

Each row of the bock table 318 corresponds to a particular logical block address 600, which is the memory block address used by the system when requesting access to data from the non-volatile memory. Thus, the data in each row of the block table 318 corresponds to the particular logical address 600 listed in the logical block address column of the block table 318. For example, the memory block status flags 602, physical address data 604, wear level indicators 606, and read count data 608 on row 1 of the block table 318 correspond to the logical address 1.

As mentioned above, each row of the block table 318 includes memory block status flags 602, a physical block address 604, a wear level indicator 606, and read count data 608. The memory block status flags 602 indicate the availability of a particular block. For example, the memory block status flags 602 can be utilized to indicate whether a particular block is bad (i.e., worn out), currently in use, free, or old data but not yet erased. The physical block address 604 stores the actual physical address in the non-volatile memory of the data associated with the corresponding logical address 600. The wear level indicator 606 stores the wear level for the associated physical block address 604. Generally, the wear level indicator 606 provides an indication of the wear level of the particular physical block address relative to the other physical block addresses in the non-volatile memory. The wear level data is utilized by the non-volatile memory file system to provide more even wear or use of the different memory block locations in the non-volatile memory. The read count data 608 provides an indication of the number of reads occurring within the associated memory block. In operation, the read count data 608 associated with a particular memory block is increment each time a page from the associated memory block is read from the non-volatile memory. When the read count 508 reaches a predetermined threshold value, the data stored in the associated memory block is moved to another memory block in physical memory.

In one embodiment, the block table 318 is loaded from the non-volatile memory 310 into system memory 306. The block table 318' loaded in system memory 306 then is utilized by the non-volatile memory file system 316 to access data in the non-volatile memory 310. For example, to access data in the non-volatile memory 310, the non-volatile memory file system 316 examines the block table 318' stored in system memory 306 to determine the physical address of a particular logical address that the system 300 wants to access. The non-volatile memory file system 316 then instructs the memory controller 308 to access the data in the memory array 312 at the particular physical address. As data is being accessed and moved in the non-volatile memory 310, the block table 318' in system memory 306 is updated to reflect the changes in the data stored in the non-volatile memory 310. Periodically, and at system shutdown, the block table 318' stored in system memory 306 is written to the non-volatile memory 310. The block table 318 can be written to a different location within the memory array 312 of the non-volatile memory 310 each time the block table 318 is written to the non-volatile memory 310.

As with cache blocks in the cache memory, when the system detects a pending loss of power and generates a flush cache command, the block table 318' stored is system memory 306 is written to a free memory block in non-volatile memory 310 based on the flush cache map 322. That is, when a flush cache command is generated, the flush cache map 322 is examined to determine a free memory block in the non-volatile memory 310 in which to store the block table 318'.

Figure 7:
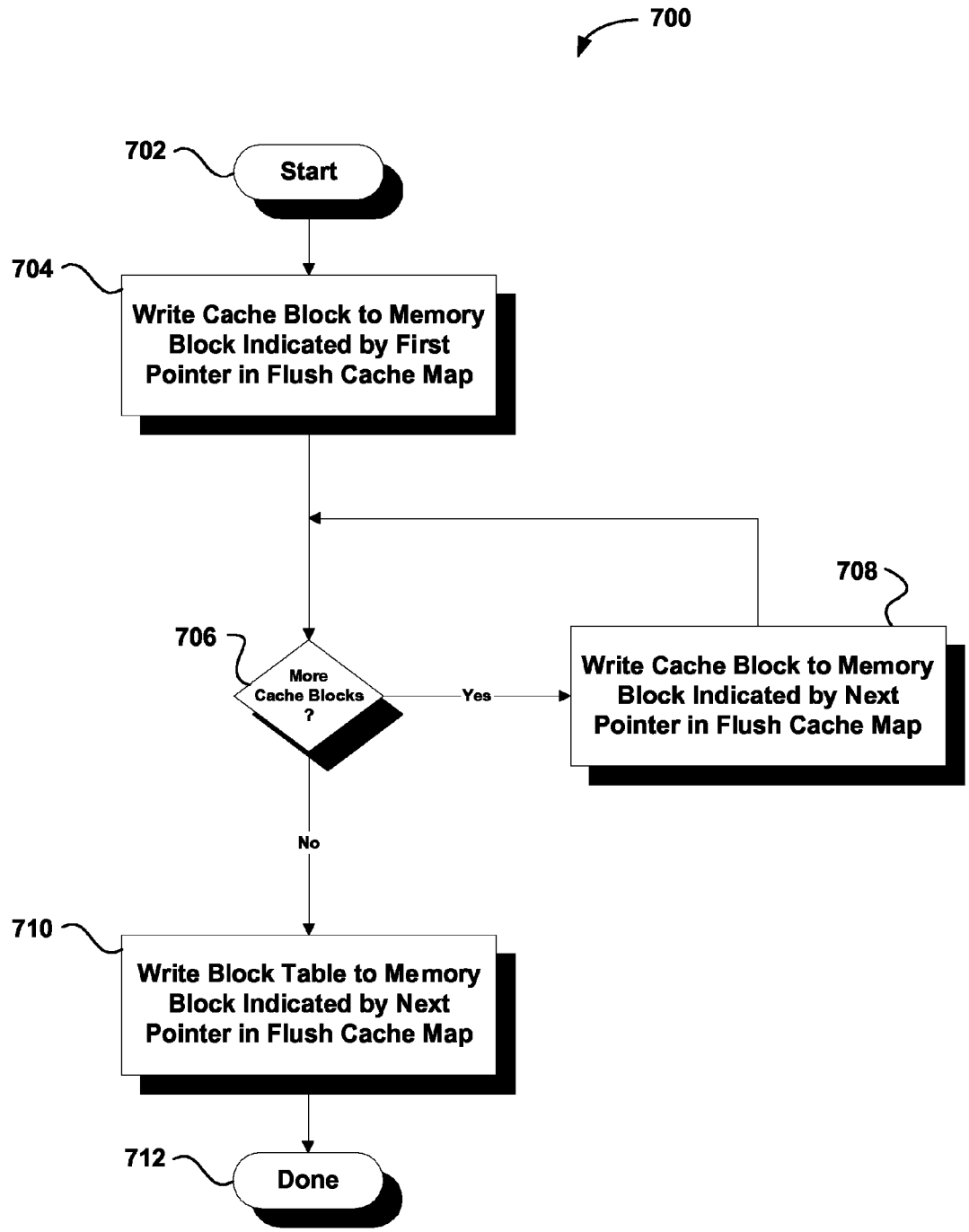
FIG. 7 is a flowchart showing a method for high speed cache flushing in a non-volatile memory utilizing a block table and a flush cache map, in accordance with an embodiment of the present invention.

FIG. 7 is a flowchart showing a method 700 for high speed cache flushing in a non-volatile memory utilizing a block table and a flush cache map, in accordance with an embodiment of the present invention. In an initial operation 702, preprocess operations are performed. Preprocess operations can include, for example, generating a flush cache map having pointers to reserved free memory blocks in non-volatile memory, detecting a pending power loss, updating the block table, and other preprocess operations that will be apparent to those skilled in the art after a careful reading of the present disclosure.

In operation 704, the first cache block in cache memory replicating a memory block in non-volatile memory is written to the memory block in non-volatile memory indicated by the first pointer in the flush cache map. As mentioned above, the flush cache map includes a plurality of pointers, each pointing to a reserved free memory block in the memory array of the non-volatile memory. In general, the number of pointers included in the flush cache map can be dependent on the amount of cache being utilized in the system. In addition, as will be discussed in greater detail subsequently, in one embodiment a pointer is maintained in the flush cache map to an additional reserved memory block for storage of the block table. Thus, the flush cache map generally includes N+1 pointers, where N is the number of cache blocks utilized in the system.

A decision is then made as whether more cache blocks need to be flushed from cache memory, in operation 706. The cache memory may include a plurality of cache blocks replicating memory blocks in the non-volatile memory. Each of these cache blocks are written to non-volatile memory when a flush cache command is generated. Hence, if more cache blocks need to be flushed from cache memory, the method 700 branches to operation 708. Otherwise, the method continues in operation 710.

In operation 708, the next cache block in cache memory replicating a memory block in non-volatile memory is written to the memory block in non-volatile memory indicated by the next pointer in the flush cache map. For example, during operation 704, using the flush cache map 322 in the example of FIG. 4, the first cache block is written to the memory block at address 2 in the non-volatile memory 31O. Then, in operation 708, the next cache block in cache memory is written to the memory block indicated by the next pointer in the flush cache map 322, in this case address 2023, and so on, until the last cache block is written to the memory block at address 4094.

When no more cache blocks need to be flushed from cache memory, the block table is written to the memory block indicated by the next pointer in the flush cache map. As mentioned above, the flush cache map includes a pointer to an additional reserved memory block for storage of the block table. Post process operations are performed in operation 712. Post process operations can include, for example, performing cache flush for other system memory, power down operations, and other post process operations that will be apparent to those skilled in the art after a careful reading of the present disclosure.

Hence, embodiments of the present invention advantageously allow each cache block and the block table to be quickly saved in a non-volatile memory without requiring searches for free memory blocks. Moreover, because free memory blocks are reserved for cache flushing, embodiments of the present invention also do not require erasing of old memory blocks, thus saving additional time during a flush cache command.

Moreover, on systems incorporating COMMAND-DMA hardware, the commands to write the cache blocks and the block table to the memory blocks indicated in the flush cache map can be pre-built in a separate command chain in RAM and be ready to execute without the need for firmware to process the building of the command chain. In this manner, the firmware only needs to inform the hardware of the location of the pre-built command chain and instruct the hardware to start processing that chain.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing a cache flush in a non-volatile memory, comprising the operations of:
   maintaining a plurality of free memory blocks within a non-volatile memory until a flush cache command is received;
   examining a flush cache map in response to the flush cache command to obtain a memory address of a memory block of the plurality of free memory blocks within the non-volatile memory, wherein the flush cache map includes a plurality of entries, each entry indicating a memory block of the plurality of free memory blocks;
   writing a cache block to a memory block at the obtained memory address within the non-volatile memory, wherein the plurality of free memory blocks comprises a predetermined number of free memory blocks, and wherein the predetermined number is based on a predetermined number of cache blocks.

2. A method as recited in claim 1, wherein each entry of the plurality of entries indicates a different free memory block of the plurality of free memory blocks in the non-volatile memory.

3. A method as recited in claim 1, wherein the plurality of entries in the flush cache map is examined sequentially to obtain addresses of free memory blocks in which to store cache blocks.

4. A method as recited in claim 1, wherein the flush cache map further includes an entry indicating a free memory block in which to store a block table, wherein the block table includes a plurality of entries mapping a physical block address of the non-volatile memory to a logical block address.

5. A method for performing a cache flush in a non-volatile memory, comprising the operations of:
   maintaining a plurality of free memory blocks within a non-volatile memory;
   examining a flush cache map to obtain a memory address of a memory block of the plurality of free memory blocks within the non-volatile memory, wherein the flush cache map includes a plurality of entries, each entry indicating a memory block of the plurality of free memory blocks;
   writing a cache block to a free memory block at the obtained memory address within the non-volatile memory; and
   examining the flush cache map to obtain an additional memory address of a memory block of the plurality of free memory blocks within the non-volatile memory, wherein a block table is written to a free memory block at the obtained additional memory address within the non-volatile memory, wherein the plurality of free memory blocks comprises a predetermined number of free memory blocks, and wherein the predetermined number is based on a predetermined number of cache blocks.

6. A method as recited in claim 5, wherein the block table includes a plurality of entries mapping a physical block address of the non-volatile memory to a logical block address.

7. A method as recited in claim 5, wherein each pointer of the plurality of entries indicates a different free memory block of the plurality of free memory blocks in the non-volatile memory.

8. A method as recited in claim 5, wherein the plurality of entries in the flush cache map is examined sequentially to obtain addresses of free memory blocks in which to store cache blocks.

9. A method as recited in claim 5, wherein the flush cache map is examined in response to a flush cache command.

10. A method as recited in claim 5, wherein the block table includes wear level data for memory blocks in the non-volatile memory.

11. A flush cache map for high speed cache flush in a non-volatile memory, comprising:
   a predetermined number of entries, wherein each entry indicates a free memory block within a non-volatile memory, and wherein each free memory block is maintained free of data during operation of the non-volatile memory; and
   an additional entry indicating an additional free memory block within the non-volatile memory, wherein a block table is written to the additional free memory block at the within the non-volatile memory, wherein the predetermined number is based on a predetermined number of cache blocks.

12. A flush cache map as recited in claim 11, wherein each entry of the plurality of pointers indicates a different free memory block in the non-volatile memory.

13. A flush cache map as recited in claim 11, wherein each entry is generated during system power-up.

14. A flush cache map for high speed cache flush in a non-volatile memory, comprising:

a predetermined number of entries, wherein each entry indicates a free memory block within a non-volatile memory, and wherein each free memory block is maintained free of data during operation of the non-volatile memory; and an additional entry indicating an additional free memory block within the non-volatile memory, wherein a block table is written to the additional free memory block at the within the non-volatile memory, wherein the predetermined number is further based on a predetermined number of cache blocks plus one.

* * * * *